(12) United States Patent  (10) Patent No.:  US 6,994,035 B2
Largent  (45) Date of Patent:  Feb. 7, 2006

(54) FEED CHUTE APPARATUS FOR GRAVITY FEEDING TIRES AND OTHER MATERIALS INTO A ROTATING KILN

(76) Inventor: Thomas R. Largent, 7931 Bass Pond Rd., Millville, CA (US) 96062

( * ) Notice: Subject to any disclaimer, the term of this patent is extended or adjusted under 35 U.S.C. 154(b) by 0 days.

(21) Appl. No.: 09/860,807

(22) Filed: May 18, 2001

(65) Prior Publication Data

US 2002/0017226 A1  Feb. 14, 2002

Related U.S. Application Data

(63) Continuation of application No. 09/448,570, filed on Nov. 23, 1999, now Pat. No. 6,234,091.

(51) Int. Cl.
*F23K 3/00* (2006.01)
(52) U.S. Cl. .................... 110/101 C; 110/186; 110/246
(58) Field of Classification Search ................ 110/116, 110/185, 186, 196, 197, 246, 255, 267, 273, 110/101 C, 191, 226; 414/149, 150, 152, 414/208
See application file for complete search history.

(56) References Cited

U.S. PATENT DOCUMENTS

| 413,902 | A | 10/1889 | Blanchard |
|---|---|---|---|
| 1,415,990 | A | 5/1922 | Carstens |
| 1,500,776 | A | 7/1924 | Spooner |
| 1,892,670 | A | 1/1933 | Jaeger |
| 2,212,702 | A | 8/1940 | Scott |
| 2,237,659 | A | 4/1941 | Edwards |
| 2,336,614 | A | 12/1943 | Jackson |
| 2,813,822 | A | 11/1957 | Collier |
| 2,824,762 | A | 2/1958 | Kaiser |
| 3,083,846 | A | 4/1963 | Walker et al. |
| 3,184,032 | A | 5/1965 | Jonsson |
| 3,357,689 | A | 12/1967 | Arneson et al. |
| 3,742,875 | A | 7/1973 | Eberle |

(Continued)

FOREIGN PATENT DOCUMENTS

DE  622757  12/1935

(Continued)

OTHER PUBLICATIONS

"Rotary Calcining Furnace," Patent Abstracts of Japan, Application No. 05143263, Jun. 15, 1993.

(Continued)

*Primary Examiner*—Kenneth Rinehart
(74) *Attorney, Agent, or Firm*—John P. O'Banion

(57) ABSTRACT

A feed chute apparatus for injecting fuel into a rotating cement kiln by gravity. The apparatus, which is positioned adjacent to a cement kiln and supported at an angle of inclination sufficient to allow tires or other combustible materials to be gravity fed into the cement kiln, has a feed ramp for guiding the combustible material into the kiln. A gate having a pair of opposing posts is positioned at the end of the feed ramp to control the rate of feed of the combustible material. In the rest position, the posts are extended in relation to the feed ramp to prevent the flow of combustible material. When the kiln rotates to a position where the feed opening in the wall of the kiln is aligned with the feed ramp, the gate retracts to allow the combustible material to be gravity fed into the kiln. The angle of inclination is selected so that there is sufficient gravitational force on the combustible material to slide down the feed ramp and into the kiln, but not so steep that the combustible material binds up in the feed chute.

11 Claims, 4 Drawing Sheets

U.S. PATENT DOCUMENTS

| | | |
|---|---|---|
| 4,230,282 A | 10/1980 | Haase |
| 4,234,283 A | 11/1980 | Twyman et al. |
| 4,526,267 A | 7/1985 | Harding et al. |
| 4,551,051 A | 11/1985 | Hofbauer et al. |
| 4,714,031 A | 12/1987 | Healy et al. |
| 4,844,292 A | 7/1989 | Lonardi et al. |
| 4,850,290 A | 7/1989 | Benoit et al. |
| 4,930,965 A | 6/1990 | Peterson et al. |
| 4,974,529 A | 12/1990 | Benoit et al. |
| 5,058,513 A | 10/1991 | Benoit et al. |
| 5,078,594 A | 1/1992 | Tutt et al. |
| 5,083,516 A | 1/1992 | Benoit et al. |
| 5,224,433 A | 7/1993 | Benoit et al. |
| 5,226,774 A | 7/1993 | Tutt et al. |
| 5,377,603 A | 1/1995 | Reese et al. |
| 5,473,998 A * | 12/1995 | Allen et al. ................. 110/247 |
| 5,497,871 A | 3/1996 | Ciolkevich |
| 5,724,899 A | 3/1998 | Reese et al. |
| 5,806,442 A | 9/1998 | Aldred et al. |
| 5,806,654 A | 9/1998 | Largent |
| 6,231,288 B1 * | 5/2001 | Largent ...................... 414/160 |

FOREIGN PATENT DOCUMENTS

| | | |
|---|---|---|
| DE | 686624 | 1/1940 |
| DE | 1223811 | 9/1966 |
| DE | 3109781 | 9/1982 |
| DE | 4022104 | 7/1990 |
| FR | 2215586 | 1/1973 |
| RU | WO 93/09381 | 3/1993 |

OTHER PUBLICATIONS

Search Report from International Application No. PCT/US00/35563; Mar. 15, 2001.

Search Report from International Application No. PCT/US00/42163; Mar. 26, 2001.

Search Report from International Application No. PCT/US00/35562, Jun. 22, 2001.

* cited by examiner

FEED CHUTE APPARATUS FOR GRAVITY FEEDING TIRES AND OTHER MATERIALS INTO A ROTATING KILN

CROSS-REFERENCE TO RELATED APPLICATIONS

This application is a continuation of application Ser. No. 09/448,570 filed on Nov. 23, 1999, now U.S. Pat. No. 6,234,091.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to using tires as a source of supplemental fuel to heat a rotating kiln, and more particularly to a feed chute apparatus for injecting tires and other combustible materials into the kiln.

2. Description of the Background Art

Rotating kilns are frequently used in the production of cement. Because such kilns operate at extremely high temperatures, it is possible to burn various forms of liquid and solid combustible waste materials as a source of supplemental heat. At the high temperatures found in such kilns, which are on the order of 3400 degrees F. and above, the waste materials tend to combust fairly completely while producing little or no undesirable gaseous or solid emissions. Therefore, these waste materials can serve as a supplemental fuel, thereby reducing the demand for and cost of the primary fuel.

One form of waste that is burned in cement kilns is rubber tires from automobiles and trucks. Rubber tires make a very good source of supplemental fuel for a rotary kiln because they burn at comparatively hot temperatures. The extremely high temperatures within a cement kiln will cause the rubber tires to burn without any significant liquid, solid or gaseous waste byproducts which might otherwise be detrimental to the environment. Accordingly, the burning of tires in rotary kilns helps alleviate the growing problem of tire disposal without significantly impairing the environment.

Conventional feed systems used for injecting tires into a cement kiln have typically suffered from several deficiencies. For example, some feed systems require that the tires be shredded and then packaged into "fuel packages" of a specific size to accommodate the dimensions of the feed system. However, such processing of used tires increases the overall cost of tire disposal, increases the cost of operating the kiln, as well as requires the use of special equipment and additional manpower to cut the tires and package the resulting pieces into suitably sized packages. Therefore, it is more efficient and cost effective to inject whole tires into the kiln.

One known method of tire injection into the kiln uses gravity to drop a tire into an opening in the kiln wall from a loading area as the kiln rotates. The loading area may be positioned vertically or rotates with the kiln and gravity causes the tire or other fuel item to slide into the interior area of the kiln when the loading area becomes disposed substantially vertically. A drawback of that type of system, however, is that the tire is dropped from the top of the kiln into highly fluidized material causing the material to splash and thereby creating excessive turbulence and inconsistent combustion within the kiln. To address that problem, feed systems have been developed that will positively inject the tire into the kiln during a portion of the rotational travel of the kiln without relying on gravity to do so.

For example, one known injection system comprises an entrance chute having an outer end portion protruding outwardly from a wall of the kiln and an inner end portion which protrudes into the kiln. The entrance chute further is disposed such that it is positioned tangentially to the kiln wall. The entrance chute includes a gate assembly having a cam follower assembly and a pivotally mounted gate member. The cam follower assembly causes the gate member to be urged pivotally between open and closed positions in response to movement of the cam follower assembly over a cylindrical camming wall positioned at a predetermined location relative to the kiln. When the cam follower assembly has caused the gate member to open, a plurality of tires or other items forming a source of supplemental fuel are positively propelled into the entrance chute by one or more external tire injecting apparatuses synchronized in operation to rotation of the kiln. A dam formed at the inner end portion of the entrance chute prevents highly fluidized material within the kiln from flowing up into the entrance chute and further forms a channel relatively free of the fluidized material into which the tires may be injected during a predetermined portion, or portions, of rotational travel of the kiln.

However, even the positive injection system described above has drawbacks, namely complexity and cost. Therefore, a need still exits for an efficient, low cost feed system for injecting tires into a rotating kiln. The gravity feed system of the present invention satisfies that need, while overcoming deficiencies found in conventional feed systems.

BRIEF SUMMARY OF THE INVENTION

The present invention is an apparatus for feeding tires and other combustible materials by gravity into a rotating kiln as a source of supplemental heat. By way of example, and not of limitation, the apparatus comprises a feed ramp that is supported by a housing having side walls and a hinged lid. A gate mechanism is positioned below the feed ramp and includes an arm assembly pivotally coupled to the sides of the housing. The arm assembly includes at least one arm with a perpendicular post at one end that blocks the end of the feed ramp in a rest position but provides a clear path when the gate mechanism pivots away from the feed ramp. A gate operator is attached to the arm assembly to impart pivotal motion upon activation. A support frame is provided to position the apparatus adjacent to a rotating kiln at a height and orientation suitable for gravity feeding of material into the kiln. Preferably, the support frame includes a staging platform on which tires and other combustible materials can be stored and then placed onto the feed ramp for delivery into the kiln.

To ensure that tires and other materials will be gravity fed into the kiln, the apparatus is oriented on the support frame such that the plane of the feed ramp has an angle of inclination between approximately 33 degrees and approximately 60 degrees, and preferably 47 degrees. To facilitate proper alignment of the apparatus with the feed opening in the kiln before releasing the tires, a sensor is used to determine the position of the feed opening relative to the feed ramp.

In operation, tires or other combustible materials are placed on the feed ramp. As the kiln rotates, the feed opening eventually comes into alignment with the feed ramp. At that point, the sensor detects this position and sends a control signal to the gate operator. The gate operator causes the arm assembly to pivot away from the feed ramp and to retract the posts. The tire or other combustible material then slides down the feed ramp and into the kiln since the angle of inclination is sufficient to allow the material to be gravity fed out of the end of the feed chute.

An object of the invention is to inject whole tires into the interior area of a rotating kiln.

Another object of the invention is to provide a tire injection system for a rotating kiln that relies solely on gravity feed.

Another object of the invention is to provide a gravity feed tire injection system that injects a whole tire into a rotary kiln at a position that is offset from vertical.

Another object of the invention is to provide a gravity feed tire injection system that is automatically controlled to inject a tire when the opening to the kiln is at a specified position around the periphery of the kiln.

Another object of the invention is to introduce a stream of tires into a rotating kiln without creating a bottleneck.

Another object of the invention is to provide a feed chute apparatus for a rotating kiln that feeds tires into the kiln at a desired rate.

Another object of the invention is to provide a feed chute apparatus for injecting tires into a cement kiln which eliminates the need to cut up or otherwise package the tires for injection.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 4, where like reference numbers denote like parts. It will be appreciated that the apparatus may vary as to configuration and as to details of the parts without departing from the basic inventive concepts disclosed herein.

Figure 1:
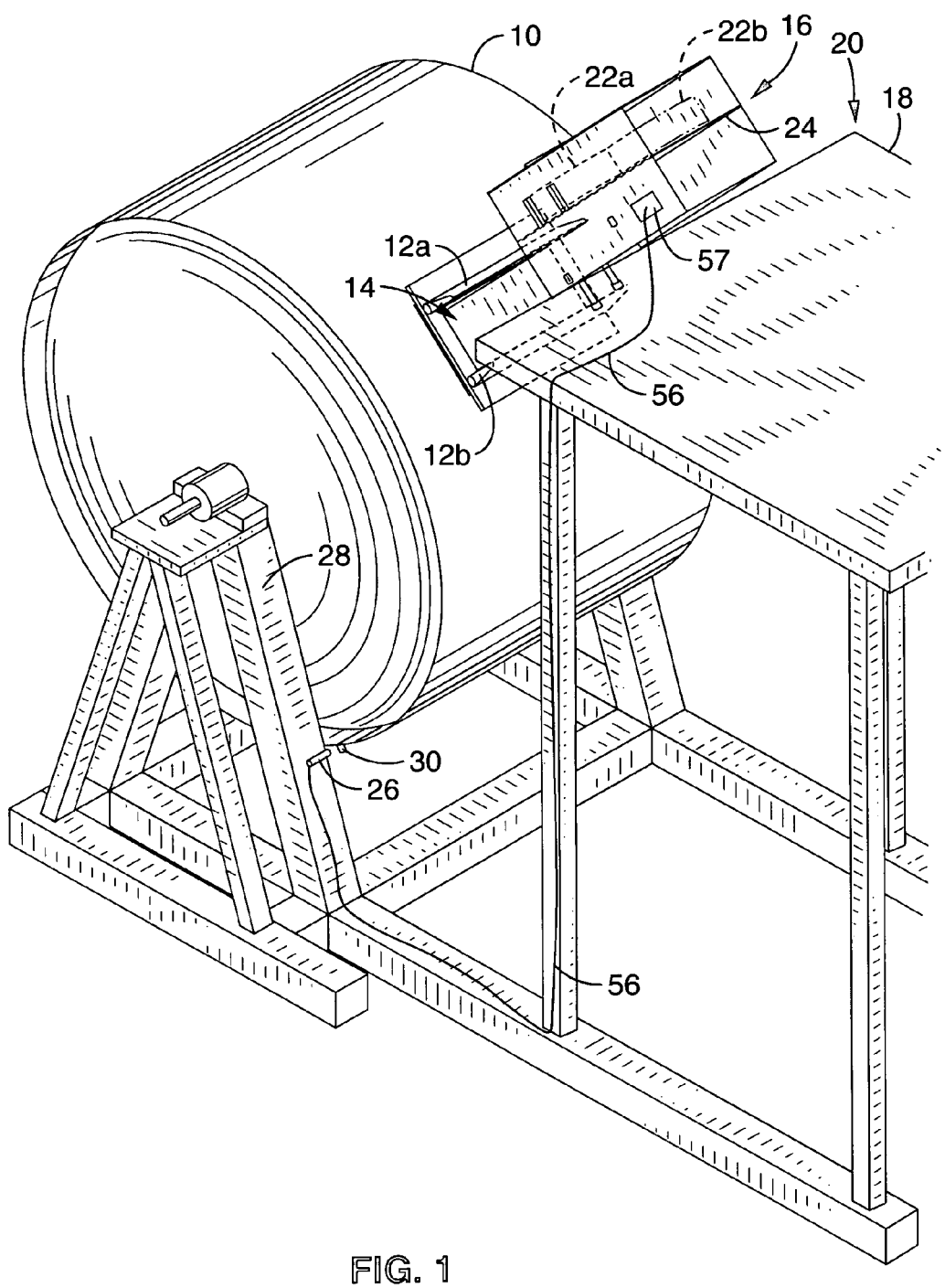
FIG. 1 is a schematic perspective view of a rotating kiln adjacent to a feed chute apparatus according to the present invention supported on a staging platform.

Referring first to FIG. 1, the present invention comprises a feed chute apparatus for injecting whole tires into a rotating kiln 10 of the type that is commonly used in the production of cement. A typical rotating kiln includes a pair of outwardly opening feed doors 12a, 12b which provide access to a feed opening 14 in the side wall of the kiln. It will be appreciated, however, that the present invention can be used with any rotating drum-type apparatus into which materials are to be injected.

In the configuration shown, the feed chute apparatus 16 of the invention is supported by a frame 18 having a staging platform 20 that is positioned adjacent the kiln. Tires and other combustible materials can be stacked on the staging platform 20 and placed in the feed chute apparatus for delivery into the kiln. It will be appreciated that the feed chute of the present invention can be supplied with tires or other materials by any number of manual or automatic feed systems presenting tires to the staging area or, preferably, directly to the chute. In FIG. 1, two tires 22a, 22b are shown positioned in the feed chute apparatus for delivery into the kiln.

Figure 2:
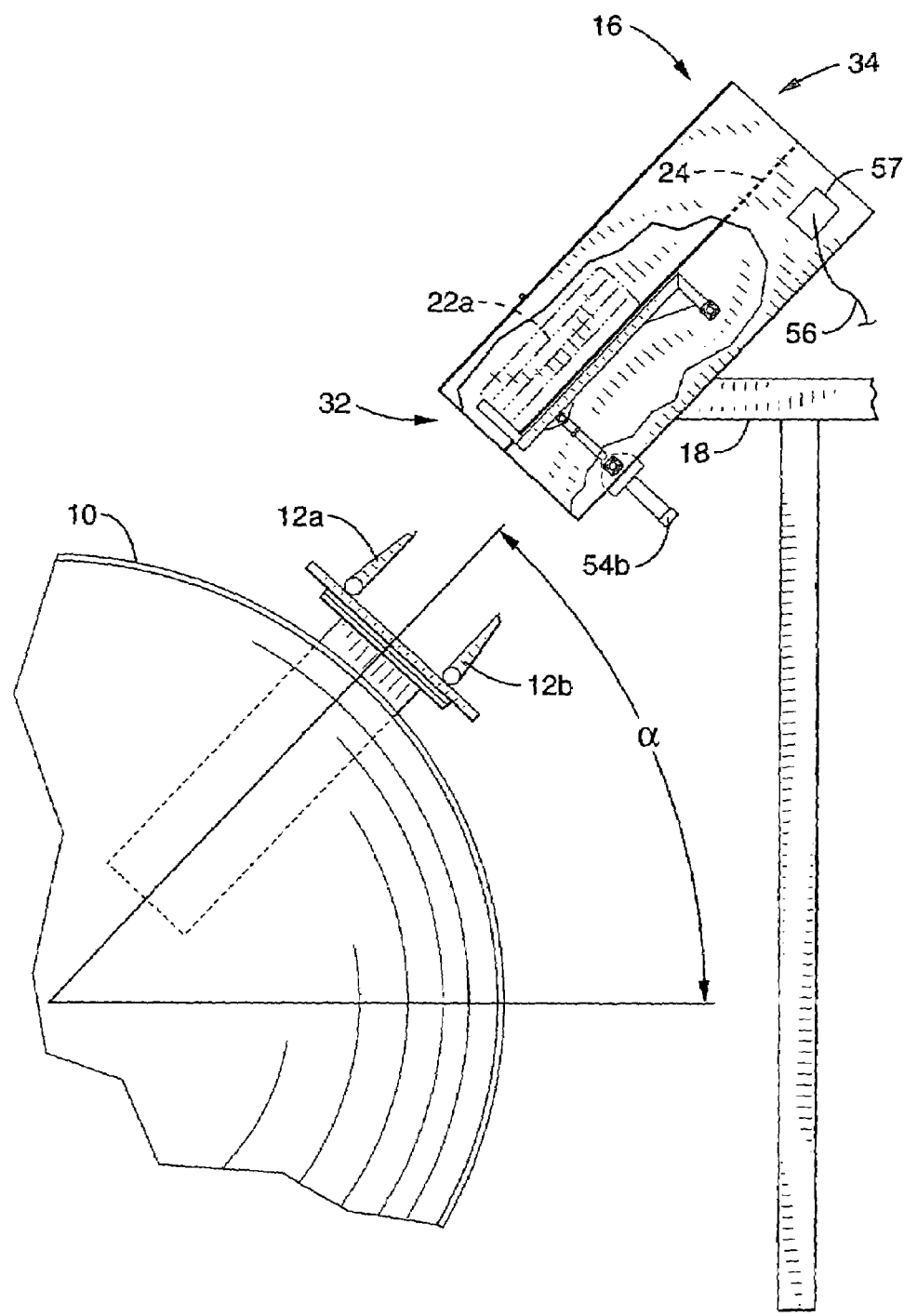
FIG. 2 is a partial schematic view, in side elevation, of the rotating kiln, feed chute apparatus, and staging platform shown in FIG. 1.

Referring also to FIG. 2, proper positioning of the feed chute apparatus in relation to the kiln is critical. In order for tires to be injected into kiln 10 by the force of gravity, the plane of the feed ramp 24 on which the tires are placed must be oriented at an angle $\alpha$ as shown in FIG. 2. It is important that the angle of feed ramp 24 be within a specific range that will maximize the effect of gravity while maintaining control of the materials being fed so that the fuel materials do not back up or bind on the feed ramp. Preferably angle $\alpha$ is approximately 47 degrees, but any angle within the range of approximately 33 degrees to approximately 60 degrees is suitable. Additionally, it is critical that the tires are not released from the feed chute apparatus until the feed doors on the kiln are in position and opened to receive the tires. To facilitate proper alignment before releasing the tires, a sensor 26 is preferably placed on the kiln frame 28 to sense a tab 30 or a sensing mark which rotates with the kiln. Sensor 26 and tab 30 are positioned such that the feed chute apparatus does not deliver a tire until the feed opening 14 is aligned with feed ramp 24. It will be appreciated that, while a sensor assembly is shown remotely mounted on the kiln support 28, this is but one example of the positioning of a sensing mechanism that could be employed. For example, the sensor could be mounted on support platform 18 or at other locations provided that proper alignment of the feed opening 14 and feed ramp 24 is detected. Additionally, any conventional sensing mechanism such as optical sensors, mechanical sensors and the like can be used.

Figure 3:
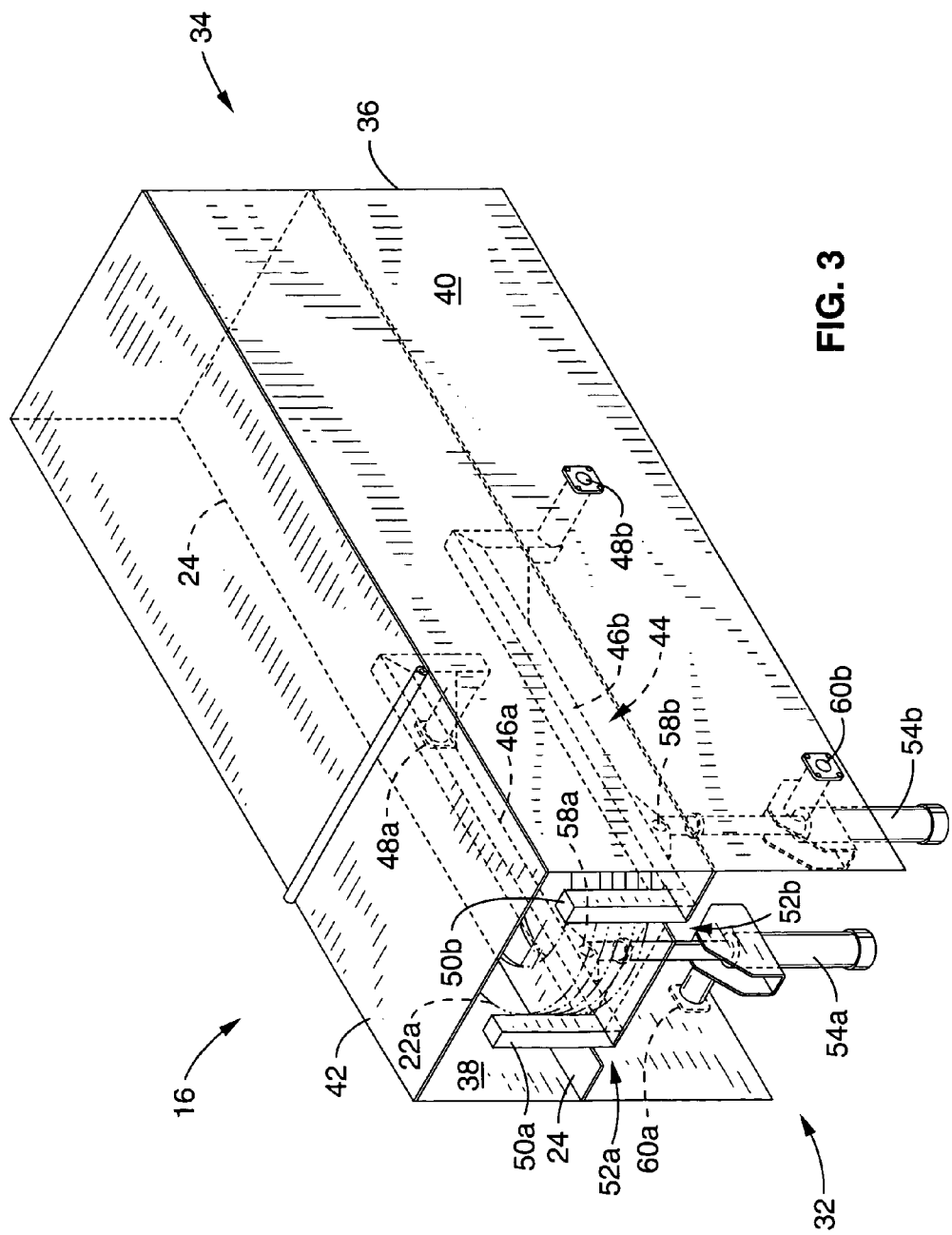
FIG. 3 is a perspective view of the feed chute apparatus of the present invention.
Figure 4:
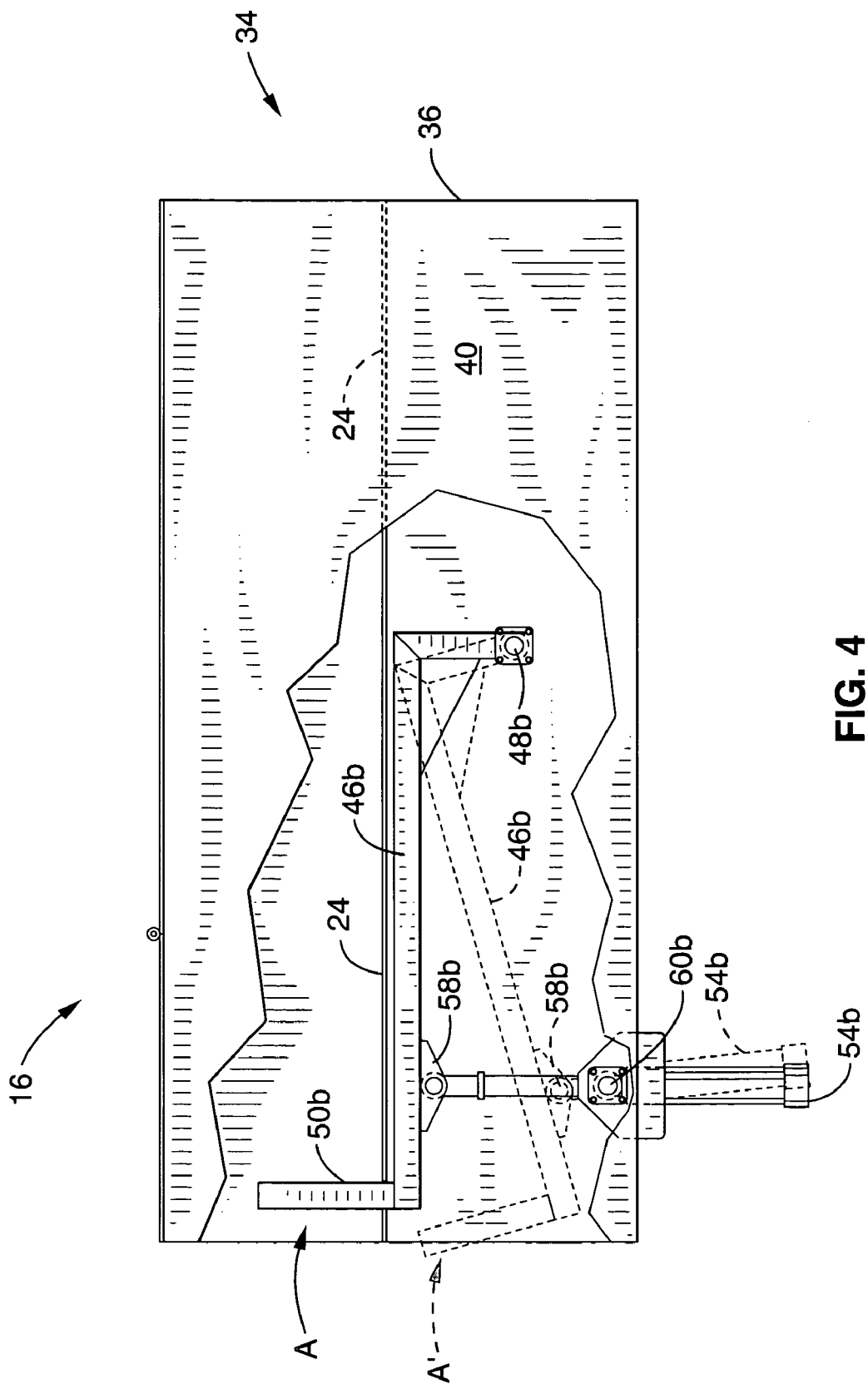
FIG. 4 is a side elevation view of the feed chute apparatus shown in FIG. 3.

Referring also to FIG. 3 and FIG. 4, the preferred embodiment of the feed chute apparatus is shown in more detail. As can be seen, feed ramp 24 has first and second ends 32, 34 respectively between which the tires pass for delivery to the kiln. In the embodiment shown, feed ramp 24 is supported by a housing 36 having side walls 38, 40 to prevent spillage. In addition, housing 36 includes a hinged lid 42 which can be opened to so that jammed materials can be cleared. While jamming is not a problem during normal operation, there are times during processing of cement when the rotational direction of the kiln must be reversed in which even materials being fed could jam between the feed chute and the kiln doors.

A gate mechanism 44 is positioned below feed ramp 24 as shown. In the embodiment shown, gate mechanism 44 comprises an arm assembly having a pair of arms 46a, 46b which are pivotally coupled at one end to side walls 38, 40 of housing 36 using flange bearings 48a, 48b, respectively.

A pair of posts 50a, 50b are positioned at the opposite ends arms 46a, 46b respectively, in a substantially perpendicular orientation in relation to the arms. Posts 50a, 50b extend through a pair of cutouts 52a, 52b in the first end 32 of feed ramp 24 for clearance when the arm assembly pivots away from the feed ramp.

A pair of gate operators 54a, 54b are attached to the undersides of arms 46a, 46b and are supported by side walls 38, 40, respectively, to impart pivoting motion to the arm assembly. Gate operators 54a, 54b are typically conventional hydraulic operated piston-type operating mechanisms that can be actuated by sensor 26 through a connecting cable 56 (see FIG. 1) that is in turn coupled to a conventional hydraulic control mechanism 57. Alternatively, gate operators 54a, 54b could be solenoid operated piston-type mechanisms or the like.

Note that gate operators 54a, 54b are pivotally coupled to arms 46a, 46b, respectively, using pivot joints 58a, 58b, respectively, as well as to side walls 38, 40, respectively using flange bearings 60a, 60b respectively, to allow pivoting motion of the arm assembly during operation. This can be seen more clearly in FIG. 4 where the arm assembly is shown as moving from an unretracted or rest position A to a retracted position A'.

While a pivoting arm assembly is preferred, it will also be appreciated that the pivoting arm assembly could be eliminated and the piston rods in the gate operators as the posts. However, using a pivoting arm assembly has been found to better regulate the speed of material release and is less prone to jamming.

Referring to FIG. 1 and FIG. 4, in operation tires are placed on feed ramp 24 either manually or by using an auxiliary mechanical feed mechanism (not shown). As kiln 10 rotates, feed opening 14 comes into alignment with feed ramp 24. At that point, sensor 26 detects tab 30 and sends a control signal to gate operators 54a, 54b. The pistons in gate operators 54a, 54b then retract causing the arm assembly to pivot away from the feed ramp and retract posts 50a, 50b. The tire or other combustible material then slides down the feed ramp and into the kiln since the angle of inclination is sufficient to allow the material to be gravity fed out the end of the feed chute. The amount of time that gate operators 54a, 54b remain in the retracted position is preset to meter the amount of material injected into the kiln and, when the amount of material is discharged (e.g., one tire), the gate operators extend the posts to their rest position where they block further material discharge until the kiln completes a full rotation.

Accordingly, it will be seen that this invention provides a simple and effective way of introducing combustible materials such as tires into a rotating kiln using gravity feed. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A feed chute apparatus for injecting fuel into a rotating kiln, comprising:
   (a) a feed ramp configured to be positioned in proximity to an opening in the side of a drum of a rotating kiln, said ramp spaced apart and separate from said drum;
   (b) a fuel release mechanism associated with said feed ramp having a a gate, a gate control mechanism and a sensor configured to activate said gate control mechanism when said opening of said drum becomes aligned with said feed ramp during rotation of the drum; and
   (c) a frame supporting the feed ramp at an angle of inclination sufficient for fuel placed on said feed ramp to be fed by gravity into said opening of the drum of the rotating kiln.

2. An apparatus as recited in claim 1, wherein said gate of said fuel release mechanism comprises at least one arm pivotally associated with said feed ramp, said arm having a post positioned at a drum end of said feed ramp.

3. An apparatus as recited in claim 1, wherein said angle of inclination ranges from approximately thirty-three degrees to approximately sixty degrees.

4. An apparatus as recited in claim 2, wherein said post is substantially perpendicular to said arm.

5. An apparatus as recited in claim 2, wherein said arm pivots in relation to the feed ramp such that said post extends and retracts in relation to said feed ramp in response to operation of said gate control mechanism.

6. An apparatus for injecting fuel into a rotating kiln, comprising:
   (a) a feed ramp configured to be positioned in proximity to a kiln door and opening in the side of a drum of a rotating kiln, said ramp spaced apart and separate from said door and said drum;
   (b) a fuel release mechanism associated with said feed ramp having a gate and at least one gate actuator;
   (c) a sensor operably coupled to said fuel release mechanism configured to synchronize the activation of said fuel release mechanism with a position of the opening of the kiln door; and
   (d) a frame supporting the feed ramp at an angle of inclination sufficient for fuel placed on said feed ramp to be fed by gravity into said opening in the drum of the rotating kiln.

7. An apparatus as recited in claim 6, wherein said gate actuator comprises at least one piston rod capable of moving said gate from a first position to a second position.

8. An apparatus as recited in claim 6, wherein said angle of inclination ranges from approximately thirty-three degrees to approximately sixty degrees.

9. A feed chute apparatus for injecting fuel into a rotating kiln as a source of supplemental heat, comprising:
   (a) a feed ramp configured to be positioned in proximity to an opening in the side of a drum of a rotating kiln, said ramp spaced apart and separate from said door and said drum;
   (b) at least one arm pivotally coupled with said feed ramp and moveable in relation to said feed ramp, said arm having a post positioned at a drum end of said feed ramp;
   (c) a control mechanism associated with the arm and configured to activate said arm when said opening in said drum of said rotating kiln is aligned with said first drum end of said feed ramp during rotation of said drum; and
   (d) a frame supporting said feed ramp at an angle of inclination sufficient for fuel placed on said feed ramp to be gravity fed into said rotating kiln.

10. An apparatus as recited in claim 9, wherein said angle of inclination ranges from approximately thirty-three degrees to approximately sixty degrees.

11. An apparatus as recited in claim 9, wherein said post is substantially perpendicular to said arm.

* * * * *